United States Patent
Li et al.

(10) Patent No.: US 10,893,397 B2
(45) Date of Patent: Jan. 12, 2021

(54) COMMUNICATION METHOD, TERMINAL, AND SYSTEM OF VARIABLE FRAME STRUCTURE FOR VEHICULAR NETWORK

(71) Applicant: SHANGHAI RESEARCH CENTER FOR WIRELESS COMMUNICATIONS, Shanghai (CN)

(72) Inventors: Qiang Li, Shanghai (CN); Peihao Xie, Shanghai (CN); Zengchao Zhang, Shanghai (CN); Fei Shen, Shanghai (CN); Wuxiong Zhang, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 0 days.

(21) Appl. No.: 16/444,453

(22) Filed: Jun. 18, 2019

(65) Prior Publication Data
US 2020/0322764 A1  Oct. 8, 2020

(30) Foreign Application Priority Data
Apr. 3, 2019  (CN) .......................... 2019 1 0268048

(51) Int. Cl.
 *H04W 4/44* (2018.01)
 *H04W 72/12* (2009.01)
 *H04L 5/00* (2006.01)

(52) U.S. Cl.
 CPC ............. *H04W 4/44* (2018.02); *H04L 5/0007* (2013.01); *H04W 72/1263* (2013.01)

(58) Field of Classification Search
 None
 See application file for complete search history.

(56) References Cited

U.S. PATENT DOCUMENTS

| 2018/0270093 | A1* | 9/2018 | Lopez | H04J 11/00 |
| 2019/0020445 | A1* | 1/2019 | Kim | H04L 1/0067 |
| 2019/0182003 | A1* | 6/2019 | Pang | H04L 27/0006 |
| 2019/0222985 | A1* | 7/2019 | Nguyen | H04L 5/0037 |

* cited by examiner

*Primary Examiner* — Diane L Lo
(74) *Attorney, Agent, or Firm* — Ladas & Parry, LLP (57) ABSTRACT

The present invention discloses a vehicular network variable frame structure communication method, and also discloses a vehicular network terminal and a vehicular network system for implementing the variable frame structure communication method. The vehicular network variable frame structure communication method reduces a communication time delay by shortening a frame length. Meanwhile, aiming at complicated and variable channel environments of vehicular network and according to a current vehicle running road grade and a road congestion condition, the insertion density and insertion period of the reference signals in subframes are adaptively adjusted, thereby improving the reliability of the entire vehicular network system while reducing the communication time delay.

14 Claims, 6 Drawing Sheets

FIG. 2(III)

COMMUNICATION METHOD, TERMINAL, AND SYSTEM OF VARIABLE FRAME STRUCTURE FOR VEHICULAR NETWORK

CROSS REFERENCE TO RELATED APPLICATION

The present application claims priority to Chinese Application No. 201910268048.3, filed on Apr. 3, 2019, the disclosure of which is incorporated herein by reference in its entirety.

BACKGROUND

Technical Field

The present invention relates to a variable frame structure communication method for vehicular network (variable frame structure communication method for short), further relates to a vehicular network terminal and a vehicular network system for implementing the variable frame structure communication method, and belongs to the technical field of vehicular network.

Related Art

Vehicular network (also known as Internet of Vehicles) is one of key technologies to realize an intelligent traffic and transportation system in the future. V2X (Vehicle to Everything) is an important key technology for implementing environment perception, information interaction, and cooperative control in vehicular network, enables interactive communication between a vehicle and a vehicle (V2V), a vehicle and a road (V2R), a vehicle and a pedestrian (V2P) as well as a vehicle and an infrastructure (V2I), and obtains a series of traffic information such as real-time road conditions, road information, and pedestrian information, thereby improving driving safety, reducing congestion, and improving traffic efficiency.

In a vehicular network environment, a communication time delay is one of core performance indexes, and different services have different requirements on the communication time delay. In March 2017, the 3GPP organization developed an LTE-V2X standard and released it as an important feature of R14 (Release 14). In the LTE-V2X standard, 27 use cases, including communication between a vehicle and a vehicle (V2V), a vehicle and a road (V2R), a vehicle and a pedestrian (V2P) as well as a vehicle and an infrastructure (V2I), are provided, and performance requirements for seven typical scenarios are given. Table 1 shows specific communication time delay requirements of this standard for automatic drive related services.

TABLE 1

Communication time delay requirements for automatic drive related services

| Service type | Use case | Use case description | Communication time delay requirement |
|---|---|---|---|
| Automatic drive related services | Pre-collision sensing warning | A pre-collision sensing warning is sent to a main vehicle when an inevitable collision is about to occur so as to enable the main vehicle to make emergency response. | 20 ms |
| | Automatic overtaking | Execution of safe overtaking operation requires cooperation among vehicles running in a plurality of lanes to create necessary gaps to allow the overtaking vehicle to timely and quickly complete the overtaking so as to avoid the collision with an oncoming vehicle. | 10 ms |
| | Cooperative vehicle collision avoidance | The collision between two or more vehicles is prevented by controlling the longitudinal speed and displacement of each vehicle along the path thereof without affecting the vehicles which are not involved. Optimal collision avoidance actions need to be calculated for all vehicles involved and are applied in a cooperative mode. | 10 ms |
| | High-density queuing | The high-density queuing is that a plurality of vehicle chains which is closely spaced is established on a highway, and has a plurality of benefits, such as fuel saving and accident prevention. | 10 ms |
| | Pre-notification | In order to ensure the safety of pedestrians crossing the road in front of the main vehicle, a camera in the main vehicle detects this situation, performs emergency response, and shares the pedestrian information related to side vehicles. | 50 ms |

With the continuous development of a V2X technology and especially autonomous vehicles, higher requirements are proposed on the communication time delay of real-time data. Meanwhile, the ultra-low time delay and high reliability scenario requirements in 5G also propose higher requirements on the air interface time delay of data transmission, and generally, the time delay needs to be controlled within 10 ms. However, the communication time delay implemented in the existing LTE (Long Term Evolution)-based vehicular network technical solution is generally between 50 ms and 100 ms. This brings a great challenge for safe driving of an autonomous vehicle in a high-speed moving scenario.

SUMMARY

Aiming at the defects of the prior art, the first technical problem to be solved by the present invention is to provide a vehicular network variable frame structure communication method.

Another technical problem to be solved by the present invention is to provide a vehicular network terminal for implementing the variable frame structure communication method.

Yet another technical problem to be solved by the present invention is to provide a vehicular network system for implementing the variable frame structure communication method.

To achieve the foregoing objectives of the invention, the following technical solutions are used in the present invention:

According to a first aspect of embodiments of the present invention, a vehicular network variable frame structure communication method is provided. In a radio frame used for vehicular network communication, a frame length is adjusted by changing a quantity of OFDM symbols in the radio frame.

Preferably, the radio frame is an up-link subframe or a down-link subframe.

Preferably, when the radio frame is the up-link subframe, the OFDM symbols are replaced with SC-FDMA symbols.

Preferably, reference signals are periodically inserted into each radio frame.

Preferably, the insertion period of the reference signals is determined by a road grade, and the higher the road grade is, the shorter the insertion period is.

Preferably, the insertion density of the reference signals is determined by a road congestion condition.

Preferably, if road congestion occurs, a high-density reference signal insertion mode is adopted, and if road congestion does not occur, a low-density reference signal insertion mode is adopted.

Preferably, the high-density reference signal insertion mode is that a quantity of the reference signals is increased in a time domain on the basis of the low-density reference signal insertion mode.

Preferably, a communication base station monitors vehicle information in real time, and if the vehicle information is changed, the communication base station adjusts the insertion period and insertion density of the reference signals according to the changed vehicle information and in combination with the current road condition.

Preferably, the vehicle information includes, but is not limited to, a vehicle running speed, a quantity of surrounding vehicles, and a distance between a vehicle and a surrounding vehicle.

Preferably, the variable frame structure communication method further includes the following steps:

in a running process, detecting the vehicle information of a vehicle on which a vehicular network terminal is mounted, and uploading the vehicle information to the communication base station in real time; and gathering traffic flow information in a management scope by the communication base station according to road grades of the positions of vehicles, and determining congestion conditions according to the quantity and running speed of the vehicles in a management area; and then, adopting different insertion periods and insertion densities of reference signals according to the road grades and the congestion conditions, and transferring reference signal adjustment information to the vehicular network terminal through a downlink shared channel.

Preferably, the variable frame structure communication method further includes the following steps:

if the vehicular network terminal correctly receives the reference signal adjustment information, adjusting the insertion period and insertion density of the reference signals according to the reference signal adjustment information, and simultaneously, sending an acknowledgement signal to the communication base station, otherwise, sending a negative acknowledgement signal.

Preferably, the frame length is determined according to the following formula:

$$l = \frac{-h + \sqrt{h^2 - 4h/\text{Ln}[1 - ber(M, R, S)]}}{2}$$

where l represents a frame length, h represents a frame header overhead, R represents coding efficiency, M represents a modulation mode, S represents a signal-to-noise ratio at the vehicular network terminal, and ber represents a code error rate.

Preferably, if a maximum available frame length is greater than a frame length corresponding to a maximum system throughput, the frame length corresponding to the maximum system throughput is selected. If the maximum available frame length is not greater than the frame length corresponding to the maximum system throughput, the maximum available frame length is selected.

Preferably, the quantity of the OFDM symbols is between 2 and 7.

Preferably, when a vehicle runs to the coverage edge of the communication base station, the frame length of the radio frame is equal to the length of 2 or 3 OFDM symbols. When the vehicle runs to the coverage center of the communication base station, the frame length of the radio frame is equal to the length of 7 OFDM symbols.

According to a second aspect of the embodiments of the present invention, a vehicular network terminal is provided, including a processing component and a memory for storing executable instructions of the processing component, where a processor is configured to execute the vehicular network variable frame structure communication method.

According to a third aspect of the embodiments of the present invention, provides a vehicular network system is provided, including a plurality of vehicular network terminals, access points, and macro nodes, where the access points and the plurality of vehicular network terminals form access point groups, and all the access point groups are respectively connected to the macro nodes through the access points.

The vehicular network terminals, the access points, and the macro nodes communicate by adopting the vehicular network variable frame structure communication method.

Compared with the prior art, the present invention creatively reduces the communication time delay by shortening the frame length. Meanwhile, aiming at complicated and variable channel environments of vehicular network and according to the current vehicle running road grade and the road congestion condition, the insertion period and insertion density of the reference signals (RS) in subframes are adaptively adjusted, thereby improving the reliability of the entire vehicular network system while reducing the communication time delay.

BRIEF DESCRIPTION OF THE DRAWINGS

FIG. 2 (I) is a schematic diagram of inserting reference signals (RS) into a radio frame on a highway; FIG. 2 (II) is a schematic diagram of inserting reference signals (RS) into a radio frame on a primary road; FIG. 2 (III) is a schematic diagram of inserting reference signals (RS) into a radio frame on a secondary road; FIG. 2 (IV) is a schematic diagram of inserting reference signals (RS) into a radio frame on a tertiary road; FIG. 2 (V) is a schematic diagram of inserting reference signals (RS) into a radio frame on a quaternary road;

DETAILED DESCRIPTION

The following further describes in detail technical content of the present invention with reference to the accompanying drawings and specific embodiments.

Figure 1:
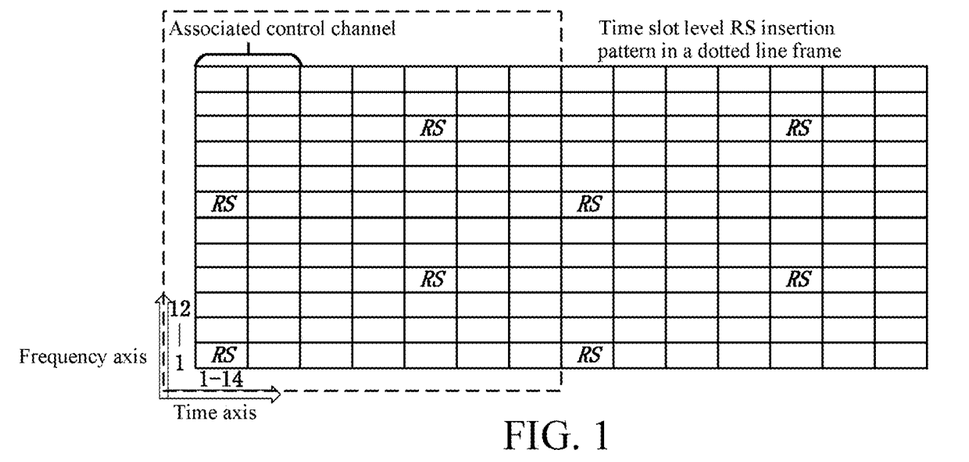
FIG. 1 is a schematic diagram of a resource mapping structure of a subframe in an LTE system.

In a traditional LTE communication system, the structure of an up-link subframe/a down-link subframe (subframe for short) is usually fixed. In an embodiment shown in FIG. 1, each subframe is 1 ms long and consists of two 0.5 ms time slots. In the case of a normal cyclic prefix (normal cp), each subframe consists of 14 OFDM symbols. The resource mapping structure in each subframe is shown in FIG. 1. Basic resource mapping units include a resource element (RE) and a resource block (RB), where each resource element consists of one OFDM symbol duration on a time axis and one subcarrier spacing on a frequency axis, and each resource block consists of 7 OFDM symbol durations on the time axis and 12 subcarrier spacings on the frequency axis. In a mapping process of a time-frequency resource, the first two or three (determined by the configuration of a communication system) OFDM symbols in each subframe are used for transmitting control signals, and each resource block is provided with a fixed quantity of resource elements according to the configuration of antenna ports so as to be used for transmitting reference signals (RS). For example, in the case of a single antenna port, each resource block is fixedly provided with 4 resource elements for transmitting reference signals (RS).

As mentioned in the above content, the existing LTE-based vehicular network technical solution can not meet the requirements of automatic drive related services on communication time delay. Therefore, the embodiments of the present invention provide a vehicular network variable frame structure communication method which can reduce the communication time delay by changing the frame length. Specifically, starting from the idea of improving the air interface efficiency, aiming at complicated and variable channel environments of vehicular network and according to the current vehicle running road grade and the road congestion condition, the variable frame structure communication method adaptively adjusts the insertion density and insertion period of reference signals (RS) in subframes, thereby improving the reliability of the entire vehicular network system while reducing the communication time delay.

For example, the frame length is adjusted by changing the quantity of OFDM symbols or SC-FDMA symbols (only used in up-link subframes) in subframes, and the transmission time can be obviously shortened. As the quantity of the OFDM symbols in the subframes decreases, data carried in the subframes decreases, and then, the processing or waiting time delay of all parts of a link is reduced so as to achieve the purpose of reducing the time delay. Meanwhile, because the frame length is shortened, a scheduling unit is shorter and more flexible. On the one hand, the vehicular network system can more quickly schedule user equipment (UE), thereby reducing the return time. On the other hand, a hybrid automatic repeat request (HARM) and channel state information (CSI) can be fed back more quickly, thereby reducing the feedback time and more quickly performing link adaptation according to the channel condition. In addition, for transmission of a small amount of data, the communication capacity of the vehicular network system can also be effectively increased by reducing the subframe length.

In an embodiment of the present invention, the variable frame structure communication method shortens/increases the frame length by reducing/increasing the quantity of the OFDM symbols in a subframe, thereby adjusting the communication time delay. In most cases, the need to shorten the frame length is dominant. Generally, it can be considered that the processing or waiting time delay and the subframe length have a linear relation, that is, compared with a subframe of which the length is equal to the length of 14 OFDM symbols in a traditional LTE communication system, the processing time delay of a subframe of which the length is equal to the length of 2 OFDM symbols is shortened by 7 times. It can be expected that as the transmission time interval (TTI) decreases, the communication time delay will be shortened in a directly proportional relation. Table 2 shows the effects obtained by shortening the frame length through a method of reducing the quantity of the OFDM symbols.

TABLE 2

Relation between user interface time delay and TTI length

| Process description (ms) | 1 ms TTI | 3-symbol TTI | 2-symbol TTI |
|---|---|---|---|
| eNB processing time delay | 1 | 3/14 | 1/7 |
| UE processing time delay | 1.5 | 4.5/14 | 1.5/7 |
| Frame alignment | 0.5 | 1.5/14 | 0.5/7 |
| Transmission interval | 1 | 3/14 | 1/7 |
| HARQ time delay | 0.1*8 | 2.4/14 | 0.8/7 |
| One-way total time delay | 4.8 | 1.03 | 0.686 |

The best way to adjust the quantity of the OFDM symbols and the technical effects thereof are further discussed below. In a radio communication system, the throughput corresponding to a radio frame is the average amount of data transmitted per second by the radio communication system, and can be expressed as a function of a code modulation mode and a signal-to-noise ratio:

$$G = \frac{l}{l+h} R \log_2 M [1 - ber(M, R, S)]^{l+h} \quad (1)$$

where G represents a radio frame throughput, l represents a frame length, h represents a frame header overhead, R represents coding efficiency, M represents a modulation mode, S represents a signal-to-noise ratio at the vehicular network terminal, and ber represents a code error rate. The optimal frame length can be obtained by deriving the formula (1) and is simplified by calculation:

$$l = \frac{-h + \sqrt{h^2 - 4h/\text{Ln}[1 - ber(M, R, S)]}}{2} \quad (2)$$

It can be learned from the formula (2) that the optimal frame length is only related to the signal-to-noise ratio (S) when the modulation coding mode and other system parameters are fixed. Different service requirements correspond to different time delay requirements and also correspond to the maximum available frame length $T_h$.

In addition, according to the formula (2), the frame length l corresponding to the maximum system throughput under the current system parameters can be calculated. If $T_h$ is greater than l, the frame length can be set as l, thereby maximizing the throughput of the entire radio communication system while meeting the system time delay requirements. If $T_h$ is less than or equal to l, the frame length needs to be set as $T_h$ so as to meet the system time delay requirements. For example, in a vehicular network environment, when a vehicle runs to the coverage edge of the communication base station, the channel quality is not ideal, and the signal-to-noise ratio (S) is smaller, so that a radio frame of which the length is equal to the length of 2 or 3 OFDM symbols can be used for sending or receiving data so as to meet the time delay requirements. When the vehicle runs to the coverage center of the communication base station, the strength of the signal received by the vehicular network terminal is large, and the signal-to-noise ratio (S) is larger, so that a radio frame of which the length is equal to the length of 7 OFDM symbols can be used for sending or receiving data. Thus, the time delay requirements can be met, and the optimal throughput can be obtained.

In the vehicular network environment, due to high-speed movement of vehicles and different vehicle density degrees, higher requirements are proposed on communication reliability. For example, terminals (vehicles, people) have high movement speed, large density, more complicated radio channel environment and more obvious Doppler frequency shift, and when the interference of a section or a frequency band is relatively serious, through the transmission mode, corresponding reference signals suffer from serious channel fading, causing great influence on the corresponding channel estimation and coherent demodulation processing at a receiving terminal. Meanwhile, when the signal information subjected to multipath propagation arrives at the receiving terminal, differences in signal amplitude, phase position, angle, and the like caused by different propagation paths can also cause intersymbol interference. Therefore, in the vehicular network environment, the communication reliability also needs to be ensured while shortening the communication time delay.

On the other hand, as the quantity of the OFDM symbols in subframes decreases, if a reference signal distribution method in an original LTE system is still used, an overhead of the reference signals are inevitably increased, causing related problems such as reduction of system throughput and reduction of spectrum efficiency. If the quantity of the reference signals is deliberately reduced in order to maintain the system throughput, the channel estimation quality is inevitably reduced, and then, the network transmission reliability is reduced, inducing a retransmission process and increasing the communication time delay to a certain extent. Therefore, how to ensure channel estimation quality while shortening the frame length to reduce the communication time delay as well as ensure transmission reliability on the premise of achieving low time delay is still a problem needing to be balanced.

Therefore, in the vehicular network variable frame structure communication method provided by the embodiments of the present invention, reference signals (RS) are periodically inserted into each radio frame (including, but not limited to, up-link subframes and down-link subframes) according to different vehicle running road grades. This is because when the quantity of the OFDM symbols in a single subframe decreases, time-frequency resources in the single subframe decrease accordingly. If the reference signals (RS) are still transmitted in each subframe, the waste of resources is inevitable. Considering the differences in vehicle running speed and vehicle density in the vehicular network environment, the vehicular network variable frame structure communication method provided by the present invention also adjusts the insertion mode of the reference signals (RS) in the radio frame from a plurality of dimensions on the basis of shortening the frame length, thereby adapting to different radio channel environments. Different embodiments are provided below for detailed description.

In an embodiment of the present invention, roads are divided into 5 grades according to the vehicle speed and vehicle density, namely, a primary road, a secondary road, a tertiary road, a quaternary road, and a highway. The vehicle running speeds of different road grades are shown in table 3:

TABLE 3

Vehicle running speeds of different road grades

| Road grade | RS insertion period grade $d_i$ | Running vehicle speed scope $V_i$ | i |
|---|---|---|---|
| Highway | Grade 5 | 80 (km/h) or above | 5 |
| Primary road | Grade 4 | 60-80 (km/h) | 4 |
| Secondary road | Grade 3 | 40-60 (km/h) | 3 |
| Tertiary road | Grade 2 | 30-40 (km/h) | 2 |
| Quaternary road | Grade 1 | 30 (km/h) or below | 1 |

Referring to the above division mode, the insertion frequencies of the reference signals (RS) are also divided into 5 grades, and the reference signals (RS) are periodically inserted into the radio frame according to different grades on different grades of roads (actually, which are also different channel environments), thereby increasing the use flexibility of the time-frequency resources aiming at different road grades (channel environments).

Figure 2:
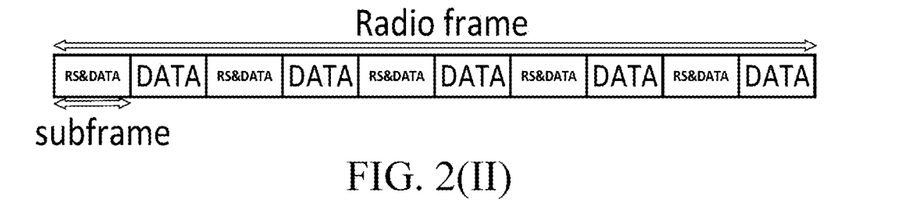
Figure 2I:
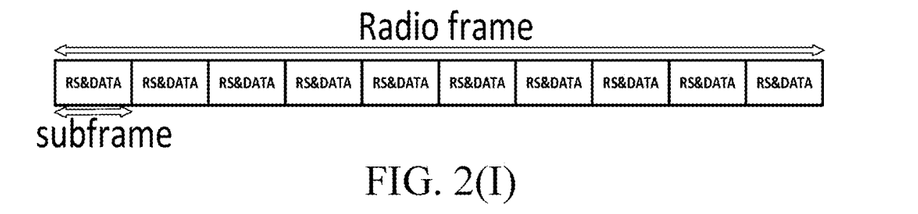
Figure 2V:
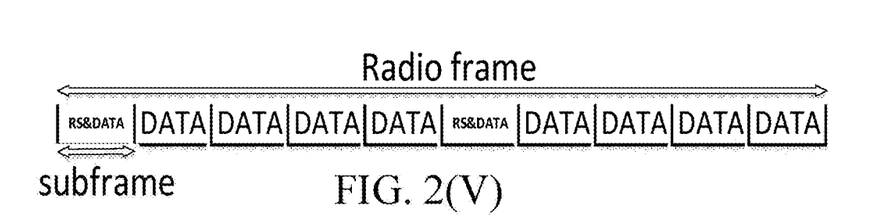

FIG. 2 (I) is a schematic diagram of inserting reference signals (RS) into a radio frame on a highway. FIG. 2 (II) is a schematic diagram of inserting reference signals (RS) into a radio frame on a primary road. FIG. 2 (III) is a schematic diagram of inserting reference signals (RS) into a radio frame on a secondary road. FIG. 2 (IV) is a schematic diagram of inserting reference signals (RS) into a radio frame on a tertiary road. FIG. 2 (V) is a schematic diagram of inserting reference signals (RS) into a radio frame on a quaternary road. It should be noted that the insertion modes of the reference signals (RS) shown in FIG. 2(I) to FIG. 2(V) are merely illustrative and do not constitute a specific limitation on the insertion mode of the reference signals (RS). In other embodiments of the present invention, other insertion modes of the reference signals (RS) can also be adopted.

In another embodiment of the present invention, in order to ensure the use flexibility of the time-frequency resource, different insertion modes of the reference signals (RS) can also be selected according to whether the road congestion occurs. Specific descriptions are as follows.

The specific definition of road congestion is that if the vehicle running speed v is obviously lower than the current road grade requirement scope $V_i$, and the vehicular network terminal access quantity n of current surrounding macro nodes (communication base stations) and access points (roadside units) is twice (twice is only an example, other multiples can also be adopted) higher than the daily average traffic flow $n_{avg}$ of this road section, it is considered that the traffic congestion occurs, namely:

$$\begin{cases} v < \min\{V_i\} \\ n > 2n_{avg} \end{cases} \quad (3)$$

In the formula (3), the vehicular network terminal access quantity n and the daily average traffic flow $n_{avg}$ of this road section are positive integers.

In the case of traffic congestion on a road, the insertion period of the reference signals (RS) is kept unchanged, and the high-density RS insertion mode is adopted. In the case of no traffic congestion on a road, the insertion period of the reference signals (RS) is kept unchanged, and the low-density RS insertion mode is adopted.

The above-mentioned low-density RS insertion mode/high-density RS insertion mode is further explained below.

For an up-link/a down-link, to implement an excessively short frame (such as a short frame of which the length is equal to the length of 2 OFDM symbols) on the existing LTE system is difficult. Furthermore, as the TTI length decreases, the overhead of control signaling and reference signals is excessively large, so that the overall performance of the LTE system is seriously weakened. Therefore, short frames with slot time level lengths are still adopted in the embodiments of the present invention. In the embodiment shown in FIG. 1, each subframe is 1 ms long and consists of two 0.5 ms time slots. In the case of a normal cyclic prefix, each subframe consists of 14 OFDM symbols. In an embodiment of the present invention, considering that the length of 7 OFDM symbols is the same as the overhead ratio of the traditional LTE system, the compatibility with technologies such as backward LTE and 5G can be ensured, therefore, by comprehensive consideration of the overhead ratio and the use ratio of radio resources, the short frame of which the length is equal to the length of 7 OFDM symbols is preferably used for performing communication.

Figure 3:
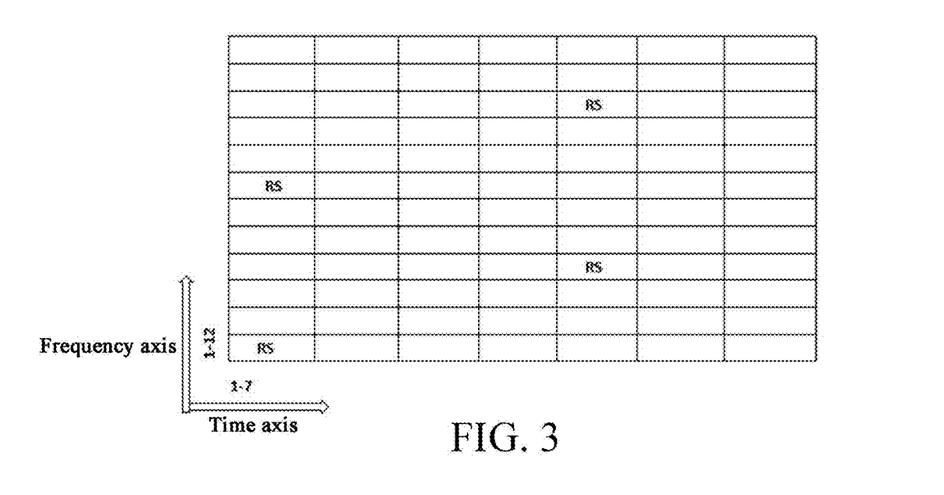
FIG. 3 is a schematic diagram of a signal mapping pattern in a low-density RS insertion mode.

For the short frame of which the length is equal to the length of 7 OFDM symbols, if the original RS mapping method of the LTE system is directly retained, a mapping pattern is shown in FIG. 3. At this time, the insertion density of the reference signals (RS) is lower. This mode is referred to as the low-density RS insertion mode.

Figure 4:
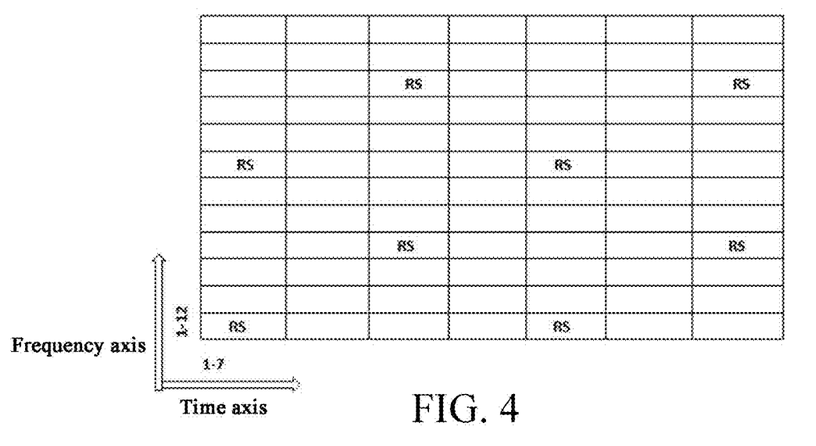
FIG. 4 is a schematic diagram of a signal mapping pattern in a high-density RS insertion mode.

On the other hand, in the vehicular network environment, the requirements on system performance are different due to different service types, and meanwhile, the channel environment is related to the current road congestion degree. In order to maintain the system throughput and reduce the code error rate when the road congestion occurs, the quantity of the reference signals (RS) can be appropriately increased in a time domain on the basis of the mapping pattern shown in FIG. 3 so as to increase the insertion density of the reference signals (RS), so that on the premise of meeting the downlink throughput requirement of the LTE system, a new mapping pattern reduces the code error rate of the entire radio communication system and improves the communication reliability. This mode is referred to as the high-density RS insertion mode. The mapping pattern corresponding to the high-density RS insertion mode is shown in FIG. 4.

Figure 5:
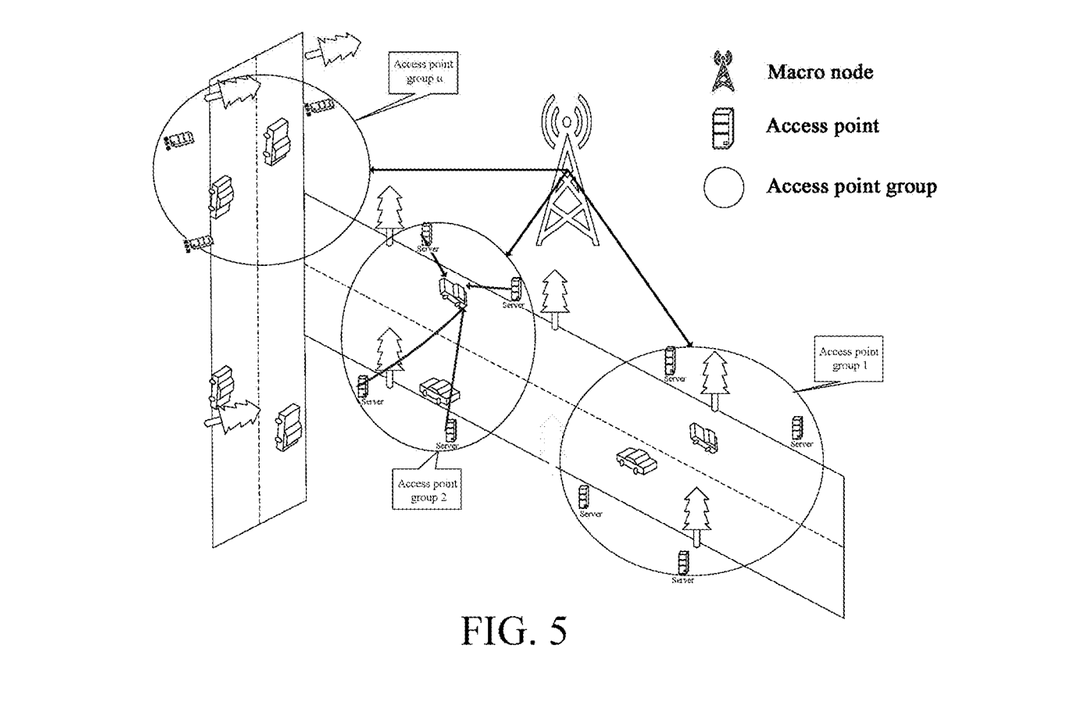
FIG. 5 is a schematic structural diagram of a vehicular network system adopting the vehicular network variable frame structure communication method.

The specific application scenarios of the vehicular network variable frame structure communication method are described in detail below according to the embodiments shown in FIG. 5 and FIG. 6. FIG. 5 shows a vehicular network system adopting the vehicular network variable frame structure communication method. The vehicular network system includes a plurality of vehicular network terminals, access points (roadside units), and macro nodes, where a plurality of vehicles carrying the vehicular network terminals and m access points in the area scope constitute corresponding access point groups (namely, an access point group 1, an access point group 2, . . . , and an access point group u, where m and u are positive integers), and the m access points are fog node servers participating in fog computing. Each access point group is connected to the macro nodes through the access points in the access point group. Each macro node is composed of communication base stations in a wide area coverage scope and is responsible for managing a plurality of access point groups within a particular area scope. In the vehicular network system shown in FIG. 5, a vehicular network terminal is connected to the corresponding access point through a 4G/5G access module, and each access point is a fog node server. The corresponding macro node has a 4G/5G base station equipment module for supporting 4G/5G communication between the macro node and each access point group. In addition, a corresponding resource scheduling module is also arranged in the vehicular network system. The resource scheduling module can be implemented by a computer or a server and is used for implementing the vehicular network variable frame structure communication method. In this embodiment of the present invention, the resource scheduling module can be arranged independently or can also be arranged together with the access points or the macro nodes to serve as a part.

Referring to FIG. 5, an access point (roadside unit) is arranged at regular intervals on the edges of the road. A plurality of vehicles (preferably, autonomous vehicles) carrying the vehicular network terminals and one or more of access points in the area scope constitute corresponding access point groups. The division of the access point groups can be implemented by a virtual cell technology. The virtual cell technology is a common radio networking technology and can implement virtualized access control of the quantity of the access points and the control scopes thereof in the access point groups according to the connection requirements of the vehicular network terminals, thereby improving the access stability of the vehicular network terminals. According to different signal coverage scopes (greatly affected by local building environments) of the access points, each access point group has its own control scope. In addition, the access point groups are connected to the macro nodes (communication base stations) through the access points in the access point groups so as to form a typical vehicular network system.

In an embodiment of the present invention, by adopting roadside units fixedly arranged on different grades of roads, in-vehicle electronic maps, GPS, and the like, whether the road grade is changed or the current road is congested is determined while the vehicle speed is changed, the current road grade and traffic flow information are acquired, different insertion periods and insertion densities of the reference signals (RS) are selected according to whether the road grade is changed or the current running road is congested. The system throughput is ensured, simultaneously the channel estimation quality is improved, the code error rate of the system is reduced, the short frame communication implemented by the embodiments of the present invention is more flexible, and the traffic reliability is improved.

Figure 6:
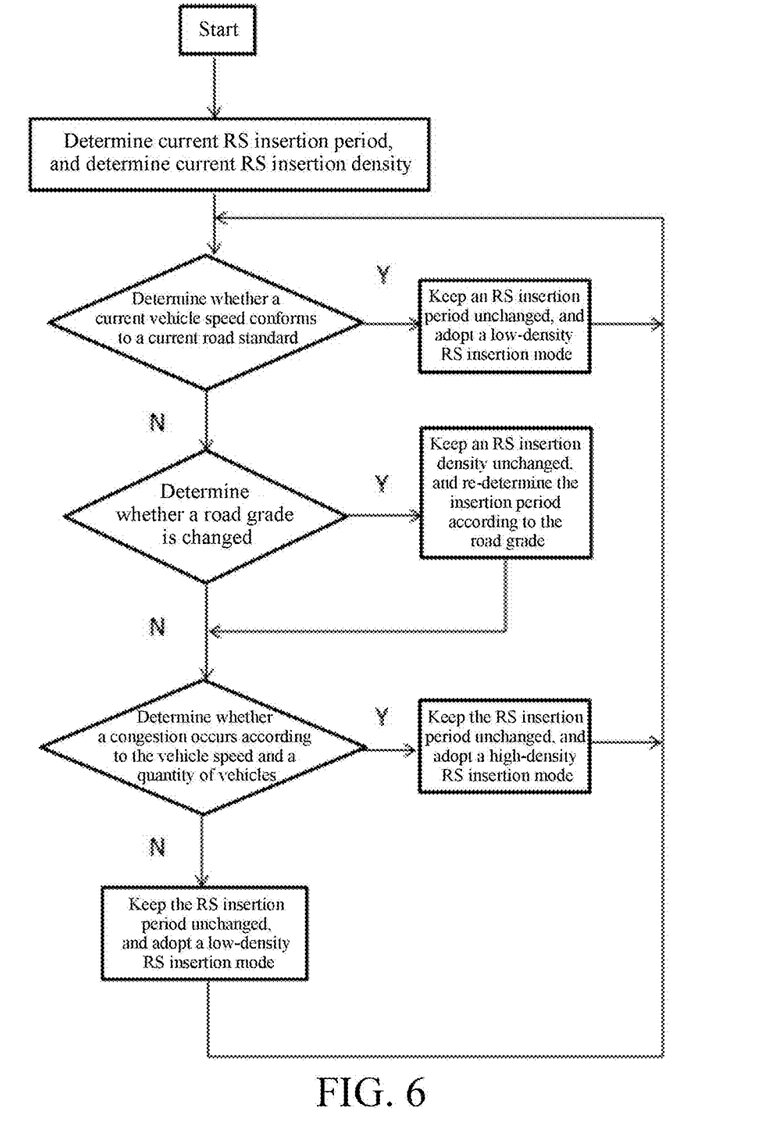
FIG. 6 is a flow diagram of determining the insertion period and insertion density of reference signals (RS) according to a road grade and a congestion condition.

As shown in FIG. 6, in a vehicle running process, the insertion period and insertion density of the current reference signals (RS) are firstly determined according to the current road grade and the congestion condition. Then, in the vehicle running process, whether the current vehicle running speed v conforms to the current road standard is periodically determined. If the current vehicle speed v conforms to the current road standard, the RS insertion period is not changed, and the low-density RS insertion mode shown in FIG. 3 is used. If the current vehicle speed v does not conform to the vehicle running speed standard $V_i$ of the current road (where i is a road grade obtained through determining previously, see table 3), namely $$v \notin V_i \qquad (4)$$

whether the road grade is changed is firstly determined according to an electronic map and vehicle position information. If the road grade is changed, the RS insertion density is kept unchanged, the RS insertion period is re-determined according to the current road grade, and then, whether the road congestion occurs is determined according to factors such as the vehicle speed and the quantity of vehicles (referring to the congestion definition shown in formula (3)). If the road grade is not changed, whether the road congestion occurs is directly determined according to factors such as the vehicle speed and the quantity of vehicles (referring to the congestion definition shown in formula (3)). If the road congestion occurs, the RS insertion period is kept unchanged, and the high-density RS insertion mode shown in FIG. 4 is adopted. If the road congestion does not occur, the RS insertion period is kept unchanged, and the low-density RS insertion mode shown in FIG. 3 is still adopted. It can be understood that if the road congestion condition changes, the corresponding RS insertion mode is also adjusted. For example, the high-density RS insertion mode is changed to the low-density RS insertion mode.

It can be learned from the embodiments shown in FIG. 5 and FIG. 6, the road grade determines the insertion period of the reference signals (RS): the higher the road grade is (that is, the higher the allowed running speed is), the shorter the insertion period is. The road congestion condition determines the insertion density of the reference signals (RS): if the congestion occurs, the high-density RS insertion mode is adopted on the premise that the insertion period is not changed, and if the congestion does not occur, the original low-density RS insertion mode is still adopted.

In the vehicle running process, the road grade and road condition of the vehicle continuously change, so that it is necessary to combine the data collected by the roadside units, in-vehicle electronic maps, GPS, and the like to perform determining at any time so as to select the insertion period and insertion density of the reference signals (RS) conforming to the current vehicle information as well as continuously perform conversion according to the vehicle information updated in real time.

Figure 7:
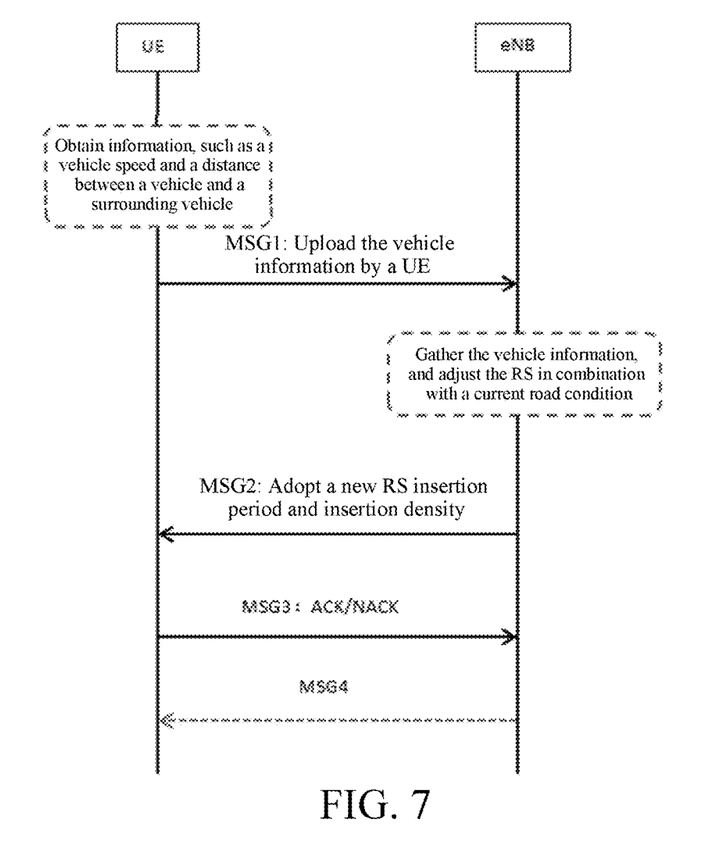
FIG. 7 is a flow diagram of adjusting the insertion period and insertion density of reference signals (RS) in real time by a communication base station according to vehicle information.

FIG. 7 is a flowchart of adjusting the insertion period and insertion density of reference signals (RS) in real time by a communication base station according to vehicle information. As shown in FIG. 7, the communication base station (eNB shown in FIG. 7) monitors the vehicle information in real time. If the vehicle information is changed, the communication base station adjusts the insertion period and insertion density of the reference signals (RS) according to the changed vehicle information and in combination with the current road condition. The method specifically includes the following steps.

MSG1: In the running process, firstly, various vehicle information of a vehicle provided with a vehicular network terminal (UE shown in FIG. 7) is detected through a plurality of sensors, and then, the detected vehicle information is uploaded to a communication base station in real time. The vehicle information at least includes a vehicle running speed, a quantity of surrounding vehicles, a distance between a vehicle and a surrounding vehicle and the like, and can further include the road grades and road conditions of the vehicles according to requirements.

MSG2: Traffic flow information in a management scope is gathered by the communication base station according to the road grades of the positions of the vehicles. The congestion condition is determined according to the quantity and running speed of the vehicles in a management region. Then, different insertion periods and insertion densities of reference signals (RS) are adopted according to the road grades and the congestion condition, and the adjusted reference signal (RS) adjustment information is transferred to the vehicular network terminal through a downlink shared channel (PDSCH).

MSG3: If the vehicular network terminal correctly receives the reference signal (RS) adjustment information, the insertion period and insertion density of the reference signals (RS) are adjusted according to the adjustment information, and simultaneously, an acknowledgement (ACK) signal is sent to the communication base station, otherwise, a negative acknowledgement (NACK) signal is sent.

MSG4: If the communication base station receives an ACK signal sent by a vehicular network terminal, the reference signal (RS) adjustment information is not resent to the vehicular network terminal within a predetermined period. If the communication base station receives an NACK signal or does not receive any feedback signal, the reference signal (RS) adjustment information is resent to the vehicular network terminal.

Figure 8:
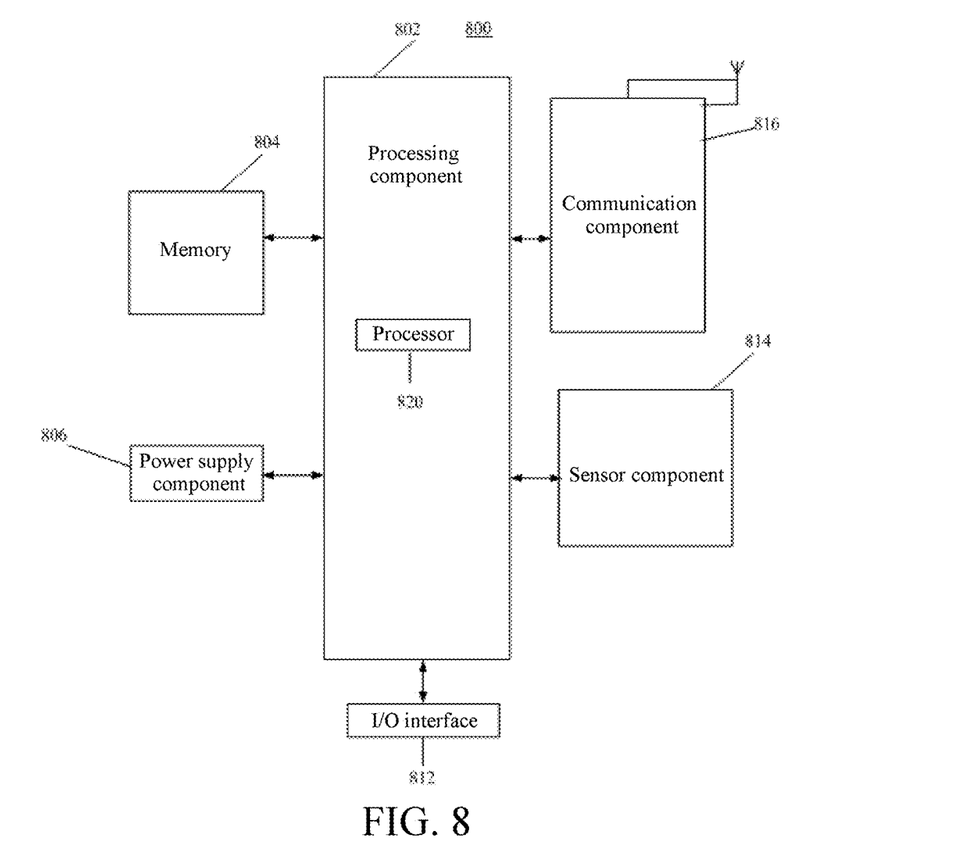
FIG. 8 is a block diagram of a structure of a vehicular network terminal shown in an embodiment of the present invention.

FIG. 8 is a block diagram of a structure of a vehicular network terminal shown in an embodiment of the present invention. Referring to FIG. 8, a vehicular network terminal 800 can include one or more following components: a processing component 802, a memory 804, a power supply component 806, an input/output (I/O) interface 812, a sensor component 814, and a communication component 816.

The processing component 802 generally controls the overall operation of the vehicular network terminal 800. The processing component 802 may include one or more processors 820 to execute instructions so as to complete all or partial steps of the above method. In addition, the processing component 802 may include one or more modules to facilitate interaction between the processing component 802 and other components.

The memory 804 is configured to store various types of data so as to support the operation at the vehicular network terminal 800. Examples of the data include any application program operated on the vehicular network terminal 800, instructions of the method, or the like. The memory 804 can be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 806 supplies power for various components of the vehicular network terminal 800. The power supply component 806 may include a power management system, one or more of power sources, and other components related to generation, management, and distribution of power for the vehicular network terminal 800.

The I/O interface 812 provides an interface between the processing component 802 and a peripheral interface module, where the peripheral interface module can be a keyboard, a roller, a button, or the like.

The sensor component 814 includes one or more sensors and is used for providing state evaluation of various aspects of the vehicular network terminal 800. In some embodiments, the sensor component 814 may include an acceleration sensor, a gyroscope sensor, a magnetic sensor, a pressure sensor, a temperature sensor, or the like.

The communication component 816 is configured to facilitate wired or wireless communication between the vehicular network terminal 800 and another device, preferably a 4G/5G access module. The vehicular network terminal 800 can be accessed to a radio network based on communication standards, such as Wi-Fi, 4G/5G, or a combination thereof.

In an exemplary embodiment, the vehicular network terminal 800 can be implemented by one or more of an application-specific integrated circuit (ASIC), a digital signal processor (DSP), a digital signal processing device (DSPD), a programmable logic device (PLD), a field programmable gate array (FPGA), a controller, a micro-controller, a micro-processor, and other electronic components, and is used for executing the vehicular network variable frame structure communication method.

The above describes in detail the vehicular network variable frame structure communication method, terminal, and system. For a person of ordinary skill in the art, any apparent change made thereon without departing from the essence of the present invention shall be considered a violation of the patent right of the present invention, and shall bear a corresponding legal responsibility.

What is claimed is:

1. A vehicular network variable frame structure communication method, comprising the following steps:
   in a running process, detecting vehicle information of a vehicle on which a vehicular network terminal is mounted, and uploading the vehicle information to a communication base station in real time; and
   gathering traffic flow information in a management area by the communication base station according to road grades of positions of vehicles, and determining congestion conditions according to a quantity and running speed of vehicles in the management area; and then, adopting different insertion period and insertion density of reference signals which are periodically inserted into each radio frame, according to the road grades and the congestion conditions, and transferring reference signal adjustment information to the vehicular network terminal through a downlink shared channel.

2. The vehicular network variable frame structure communication method according to claim 1, wherein
   the radio frame is an up-link subframe or a down-link subframe.

3. The vehicular network variable frame structure communication method according to claim 1, wherein
   an insertion period of the reference signals is determined by a road grade, and the higher the road grade is, the shorter the insertion period is.

4. The vehicular network variable frame structure communication method according to claim 1, wherein
   an insertion density of the reference signals is determined by a road congestion condition.

5. The vehicular network variable frame structure communication method according to claim 4, wherein
   if road congestion occurs, a high-density reference signal insertion mode is adopted, and if road congestion does not occur, a low-density reference signal insertion mode is adopted.

6. The vehicular network variable frame structure communication method according to claim 5, wherein
   the high-density reference signal insertion mode is that a quantity of the reference signals is increased in a time domain on the basis of the low-density reference signal insertion mode.

7. The vehicular network variable frame structure communication method according to claim 1, wherein
   the vehicle information comprises a vehicle running speed, a quantity of surrounding vehicles, and a distance between a vehicle and a surrounding vehicle.

8. The vehicular network variable frame structure communication method according to claim 1, comprising the following steps:
   if the vehicular network terminal correctly receives the reference signal adjustment information, adjusting the insertion period and insertion density of the reference signals according to the reference signal adjustment information, and simultaneously, sending an acknowledgement signal to the communication base station, otherwise, sending a negative acknowledgement signal.

9. The vehicular network variable frame structure communication method according to claim 1, wherein a frame length is determined according to the following formula:

$$l = \frac{-h + \sqrt{h^2 - 4h/\text{Ln}[1 - ber(M, R, S)]}}{2}$$

wherein l represents the frame length, h represents a frame header overhead, R represents coding efficiency, M represents a modulation mode, S represents a signal-to-noise ratio at the vehicular network terminal, and ber represents a code error rate.

10. The vehicular network variable frame structure communication method according to claim 9, wherein
    if a maximum available frame length is greater than a frame length corresponding to a maximum system throughput, the frame length corresponding to the maximum system throughput is selected; and if the maximum available frame length is not greater than the frame length corresponding to the maximum system throughput, the maximum available frame length is selected.

11. The vehicular network variable frame structure communication method according to claim 1, wherein
    in the radio frame used for vehicular network communication, a frame length is adjusted by changing a quantity of OFDM symbols in the radio frame, the quantity of the OFDM symbols is between 2 and 7.

12. The vehicular network variable frame structure communication method according to claim 11, wherein
    when a vehicle runs to a coverage edge of the communication base station, the frame length of the radio frame is equal to a length of 2 or 3 OFDM symbols; and when the vehicle runs to a coverage center of the communication base station, the frame length of the radio frame is equal to a length of 7 OFDM symbols.

13. A vehicular network terminal, comprising a processing component and a memory for storing executable instructions of the processing component, wherein a processor is configured to execute the vehicular network variable frame structure communication method according to claim 1.

14. A vehicular network system, comprising a plurality of vehicular network terminals, access points, and macro nodes, wherein the access points and the plurality of vehicular network terminals form access point groups, and all the access point groups are respectively connected to the macro nodes through the access points, wherein the vehicular network terminals, the access points, and the macro nodes communicate by adopting the vehicular network variable frame structure communication method according to claim 1.

* * * * *